United States Patent
Dai et al.

(10) Patent No.: US 12,436,510 B2
(45) Date of Patent: Oct. 7, 2025

(54) INDUSTRIAL PROCESS SOFT SENSOR METHOD BASED ON FEDERATED STOCHASTIC CONFIGURATION NETWORK

(71) Applicant: CHINA UNIVERSITY OF MINING AND TECHNOLOGY, Jiangsu (CN)

(72) Inventors: Wei Dai, Jiangsu (CN); Lanhao Wang, Jiangsu (CN); Liang Dong, Jiangsu (CN); Mengjie Hu, Jiangsu (CN); Guanghui Wang, Jiangsu (CN); Jing Nan, Jiangsu (CN); Langlong Ji, Jiangsu (CN); Yanshuang Ao, Jiangsu (CN); Dianhui Wang, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/002,274

(22) PCT Filed: Jun. 23, 2022

(86) PCT No.: PCT/CN2022/100744
§ 371 (c)(1),
(2) Date: Dec. 19, 2022

(87) PCT Pub. No.: WO2023/035727
PCT Pub. Date: Mar. 16, 2023

(65) Prior Publication Data
US 2024/0027976 A1    Jan. 25, 2024

(30) Foreign Application Priority Data
Sep. 9, 2021 (CN) .......................... 202111054478.9

(51) Int. Cl.
*G06N 3/045* (2023.01)
*G05B 13/02* (2006.01)

(52) U.S. Cl.
CPC .......... *G05B 13/027* (2013.01); *G06N 3/045* (2023.01)

(58) Field of Classification Search
CPC .............................. G05B 13/027; G06N 3/045
See application file for complete search history.

(56) References Cited

U.S. PATENT DOCUMENTS

2019/0385043 A1 * 12/2019 Choudhary ......... G06F 13/4213
2021/0012196 A1 *  1/2021 Lalitha ..................... G06N 7/01
(Continued)

*Primary Examiner* — Gary Collins

(57) ABSTRACT

Provided is an industrial process soft sensor method based on a federated stochastic configuration network, including: acquiring historical industrial process auxiliary data and corresponding product quality data; finding out optimal hidden layer parameters; processing, by a central server, to obtain global parameters, and downloading same to each factory as hidden layer parameters for a local model; obtaining output weights of a current network through an optimization algorithm, and uploading same to the server for weighted aggregation; and when the number of hidden layer nodes in a current network exceeds a maximum given value or a residual in current iteration meets an expected tolerance, completing modeling to obtain the global federated stochastic configuration network without adding new nodes. The present disclosure effectively improves prediction performance of models and protects data privacy, thus meeting industrial process soft sensor requirements.

8 Claims, 1 Drawing Sheet

(56) References Cited

U.S. PATENT DOCUMENTS

| | | | |
|---|---|---|---|
| 2022/0044117 A1* | 2/2022 | Song | G06N 3/04 |
| 2022/0121999 A1* | 4/2022 | Wang | G06N 5/04 |
| 2023/0087863 A1* | 3/2023 | Gong | G06F 18/24133 |

* cited by examiner

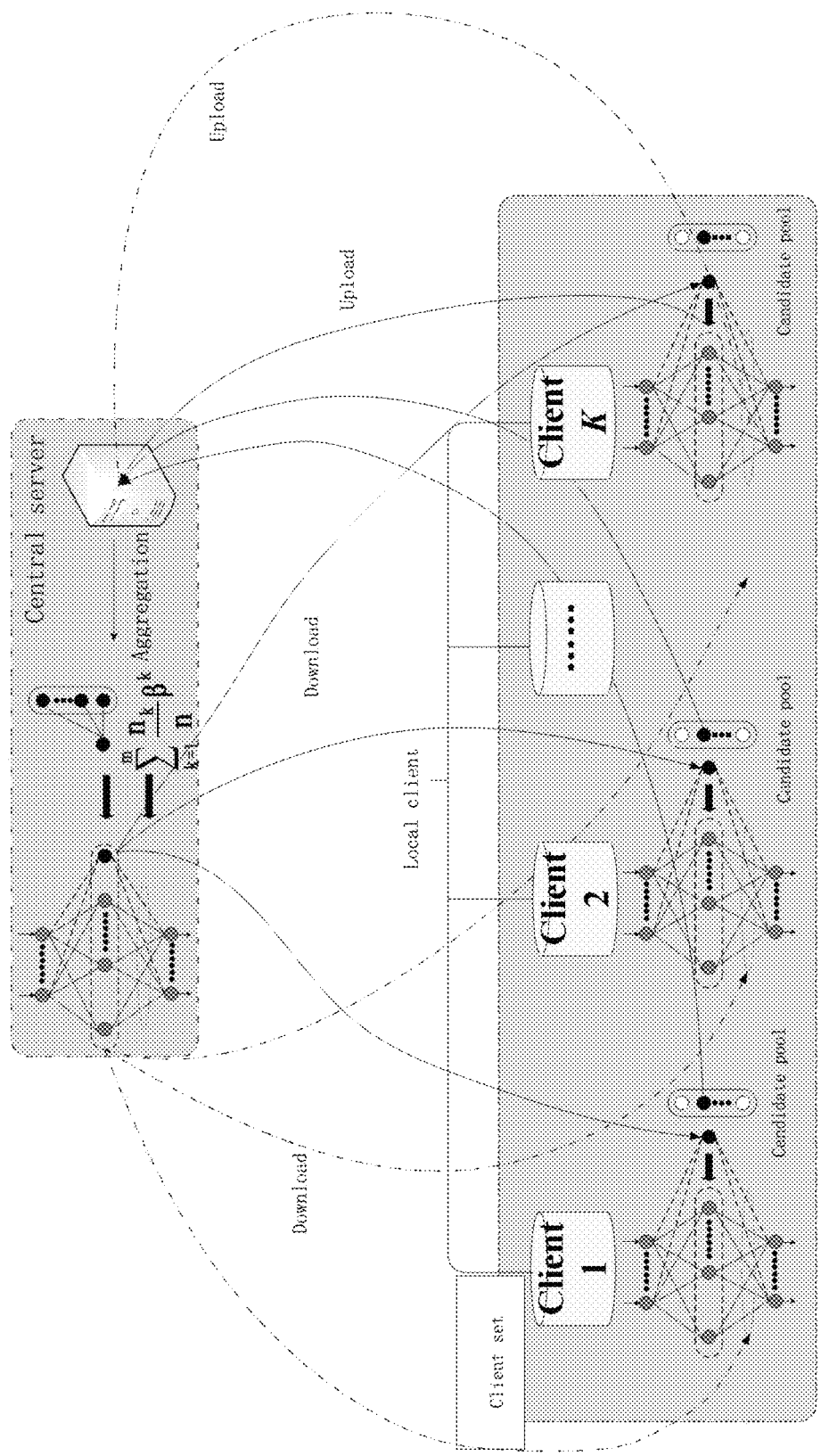

INDUSTRIAL PROCESS SOFT SENSOR METHOD BASED ON FEDERATED STOCHASTIC CONFIGURATION NETWORK

TECHNICAL FIELD

The present disclosure relates to the technical field of soft sensor of industrial process product quality indicators, in particular to an industrial process soft sensor method based on a federated stochastic configuration network.

BACKGROUND ART

In order to lower production cost and improve production efficiency and quality, a soft sensor technology that can accurately predict the product quality index in real time is an important research direction in the field of complex industrial process control today, and has a far-reaching significance and a practical application value. Due to the problem of insufficient data in the field of complex industry, if multi-party enterprises do not exchange and integrate data, the effect indicators obtained by artificial intelligence model training and prediction are not ideal and difficult to apply. With the further development of big data, paying attention to data privacy and security has become a worldwide trend. Therefore, all countries are strengthening the protection of data security and privacy. A new law, General Data Protection Regulation (GDPR), recently introduced by the European Union shows that the increasingly strict management of user data privacy and security will be a world trend, which brings unprecedented challenges to the field of artificial intelligence. Federated learning, as a machine learning framework, can achieve a unified machine learning model trained from local data of multiple participants under the premise of protecting data privacy. Therefore, in privacy-sensitive scenarios (including financial industry, industry and many other data perception scenarios), the federated learning has shown excellent application prospects. At present, the federated learning is mainly combined with deep learning, but a deep algorithm itself has some bottleneck problems that are difficult to solve, such as falling into local minima, strong dependence on the setting of initial parameters, gradient disappearance and gradient explosion, so that it is difficult to give full play to the strong learning ability of neural networks. As an advanced single hidden layer random weight network with universal approximation property, a stochastic configuration network has been proved to have obvious advantages in compactness, fast learning and generalization performance by a large number of regression and classification experiments.

SUMMARY OF THE INVENTION

The objective of the present disclosure: in view of small amount of data of existing industrial process products and the difficulty in concentrating data training of all parties, the present disclosure provides an industrial process soft sensor method based on a federated stochastic configuration network, including the following steps:

step 1. acquiring, by each factory, historical industrial process auxiliary data and corresponding product quality data, and initializing parameters required for local stochastic configuration network model learning, each factory being a client, and each client putting hidden layer nodes that meet local data constraints into a candidate pool, selecting best candidate nodes from the candidate pool, and uploading same to a central server;

step 2. performing, by the central server, weighted aggregation or greedy selection on the uploaded best candidate nodes to obtain global parameters, and downloading the global parameters to each client as hidden layer parameters for a local stochastic configuration network model;

step 3. after obtaining the global parameters, calculating, by each client, newly added hidden layer outputs, and uploading output weights to the central server for weighted aggregation, and continuing to start a next round of training;

step 4. when the number of hidden layer nodes in a current network exceeds a maximum given value or a residual in current iteration meets an expected tolerance, adding no new nodes, and stopping federated training to obtain a trained global model; and step 5. distributing the trained global model, by the server, to each local factory as a soft sensor model.

In step 1, a total of K factories are set to participate in the federated training, and for the kth factory, $n_k$ groups of historical industrial process auxiliary data $X^k$ and the corresponding product quality data $T^k$ are obtained, denoted as $\{X^k, T^k\}$; the historical industrial process auxiliary data $x_i^k$ in the ith group of the kth factory contains d auxiliary process variables, the corresponding product quality data $t_i$ contains m product quality data, and if the value of i is 1 to $n_k$, then an input sample matrix is $X^k = \{x_1^k, x_2^k, \ldots, x_i^k, \ldots x_{n_k}^k\}$; and the set of z auxiliary process variables in the ith group is denoted as $\{x_{i1}^k, x_{i2}^k, \ldots, x_{iz}^k\}$, where $x_{iz}^k$ represents the z auxiliary process variables in the ith group of the kth factory.

In step 1, all the K factories perform the same industrial process; and most of the same industrial processes adopt the same process flow and process equipment, which have characteristic similarity.

In step 1, the initialized parameters required for local stochastic configuration network learning include: a maximum number of hidden layer nodes $L_{max}$, a maximum number of random configuration times $T_{max}$, an expected tolerance $\varepsilon$, a hidden layer parameter random configuration range $Y = \{\lambda_{min} : \Delta\lambda : \lambda_{max}\}$, a learning parameter r, an activation function $g(\cdot)$, and an initial residual $e_0 = T^k$, where $\lambda_{min}$ is a lower limit of allocation interval of random parameters, $\lambda_{max}$ is an upper limit of allocation interval of the random parameters, and $\Delta\lambda$ is an incremental parameter of allocation interval of the random parameters.

Step 1 further includes:

in a construction process of a local stochastic configuration network of each client, randomly generating the hidden layer parameters $w_L^k$ and $b_L^k$ in an adjustable symmetric interval Y, respectively;

outputting nodes in hidden layers $h_L^k = [g((w_L^k)^T x_1^k + b_L^k), g((w_L^k)^T x_2^k + b_L^k), \ldots, g((w_L^k)^T x_N^k + b_L^k)]^T$, where the superscript T is transpose of a matrix or vector;

setting $\mu_L = (1-r)/(L+1)$, where L is the total number of the hidden layer nodes of a current local stochastic configuration network model, r represents the learning parameter, $\mu_L$ is a non-negative real number sequence;

finding out the hidden layer nodes that satisfy the following inequality constraints as candidate nodes:

$$\min\{\xi_{L,1}^k, \xi_{L,2}^k, \xi_{L,q}^k, \ldots, \xi_{L,m}^k\} \geq 0$$

where $$\xi_{L,q}^k = \frac{\langle e_{L-1,q}^T, h_L^k \rangle^2}{(h_L^k)^T \cdot h_L^k} - (1-r-\mu_L)\|e_{L-1,q}^T\|, q = 1, 2, \ldots m;$$

in the formula, m represents the dimension of an output of each training set, the symbol $\langle \bullet, \bullet \rangle$ represents an inner product of the vector, $\xi_{L,q}^k$ represents a supervision mechanism corresponding to the $q^{th}$ output of each training set when the current number of the hidden layer nodes in the client k is L, $\xi_L^k = \sum_{q=1}^m \xi_{L,q}^k$ is calculated to obtain newly added candidate nodes $(\xi_L^1)^k, (\xi_L^2)^k, \ldots (\xi_L^j)^k$, $j \leq T_{max}$ for constructing the candidate pool, where $\xi_L^k$ represents a node supervision value randomly configured by the kth client during the Lth iteration, and $(\xi_L^j)^k$ represents another node supervision value obtained by the jth random configuration performed in the kth client during the Lth iteration; and finding out a group of hidden layer parameters that maximize $\xi_L^k$, which are the best hidden layer parameters $(w_L^k)^*$, and $(b_L^k)^*$ that satisfy the supervision mechanism.

Step 1 further includes: selecting the best candidate nodes from the candidate pool and uploading same to the central server, including weighted aggregation and greedy selection:

uploading $(w_L^k)^*$ and $(b_L^k)^*$ by means of the weighted aggregation; and uploading $(w_L^k)^*, (b_L^k)^*$ and corresponding $\xi_L^k$ by means of the greedy selection.

Step 2 includes:

performing, by the central server, the weighted aggregation on the uploaded best candidate nodes to obtain global parameters $w_L^*$ and $b_L^*$ of the Lth node of the model;

where $$w_L^* = \sum_{k=1}^K \frac{n_k}{n}(w_L^k)^*, b_L^* = \sum_{k=1}^K \frac{n_k}{n}(b_L^k)^*;$$

and in the formula, n is the sum of local historical industrial process auxiliary data $n_k$ of all the clients.

In step 2, performing the greedy selection on the uploaded best candidate nodes by means of the central server includes:

comparing, by the central server, the uploaded parameters $\xi_L^k$, and selecting client parameters corresponding to the maximum $\xi_L^k$ as the global parameters $w_L^*$ and $b_L^*$ of the Lth node of the model;

where $$[W_L^*, b_L^*] = \underset{(w_L^k)^*,(b_L^k)^* \in \Theta}{\arg\max} \{\xi_L^k \in \Xi\}, k = 1, 2, \ldots, K;$$

and in the formula, $\Theta$ is a set of optimal parameters $(w_L^k)^*$ and $(b_L^k)^*$ uploaded by each client, and $\Xi$ is a set of $\xi_L^k$.

Step 3 includes:

according to the current global parameters $w_L^*$ and $b_L^*$, calculating, by each client, the newly added hidden layer outputs $H_L^k$:

$$H_L^k = [g((w_L^*)^T x_1^k + b_L^*), g((w_L^*)^T x_2^k + b_L^*), \ldots, g((w_L^*)^T x_N^k + b_L^*)]^T$$

calculating a local hidden layer output matrix $\beta_L^k$ of the client:

$$\beta_L^k = (H_L^k)^+ T^k$$

where the current hidden layer output matrix is $H_L^k = [H_1^k, H_2^k, \ldots, H_L^k]$; and in the formula, $\beta_L^k$ represents that each client of the local clients k uploads the output matrix $\beta_L^k$ to the central server, and the central server performs the weighted aggregation on the uploaded $\beta_L^k$ to obtain a global output matrix $\beta_L$, where $$\beta_L = \sum_{k=1}^K \frac{n_k}{n} \beta_L^k.$$

Beneficial effects: compared with the prior art, the present disclosure has the advantages that the method uses a dynamically configured federated learning way to train the models, and establishes an industrial process product quality soft sensor model with optimal parameters and universal approximation property in a form of a construction method, which requires no complicated retraining process, and can ensure the accuracy of the models. Therefore, the present disclosure has good compactness and generalization performance.

BRIEF DESCRIPTION OF THE DRAWINGS

The present disclosure will be further described in detail below with reference to the accompanying drawings and specific implementations, and the above-mentioned and/or other advantages of the present disclosure will become clearer.

FIG. 1 is a schematic diagram of a federated stochastic configuration network model.

DETAILED DESCRIPTION OF THE INVENTION

The present disclosure provides an industrial process soft sensor method based on a federated stochastic configuration network. A fitting model structure used in the present disclosure is shown in FIG. 1, and includes an input layer, a hidden layer and an output layer, where d=5, and m=1. The present disclosure includes the following steps:

Step 1. Each factory selects 100 groups of historical data measured in a traditional hematite grinding process from a historical local database of grinding process. That is, each group contains five auxiliary process variable data, namely, ball mill current $c_1$ and spiral classifier current $c_2$, mill feeding capacity $c_3$, mill inlet feed water flow $c_4$ and classifier overflow concentration $c_5$, and $x_i^k = \{c_{i1}^k, c_{i2}^k, \ldots, c_{i5}^k\}$ is used to represent input data after homogenization of the kth client and its corresponding product quality data, i.e., a grinding particle size value $t_i$. $c_{i5}^k$ represents the $c_5$ auxiliary process variable data of the ith sample of the kth client. There are 10 factories participating in the training, with a total of 1000 groups of historical data, including 800 groups as training sets and 200 groups as test sets. Input samples are $X^k = \{x_1^k, x_2^k, \ldots x_i^k, \ldots x_{80}^k\}$, where $x_i^k = \{c_{i1}^k, c_{i2}^k, \ldots, c_{i5}^k\} \in \Re^5$, and output samples are $T^k = \{t_1^k, t_2^k, \ldots, t_i^k, \ldots, t_{80}^k\}$.

Parameters required for federated stochastic configuration network soft sensor model learning are initialized. A maximum number of hidden layer nodes $L_{max}$ is equal to 100, a maximum number of configuration times $T_{max}$ is equal to 20, an expected tolerance $\varepsilon$ is equal to 0.05, a hidden layer parameter random configuration range Y is {1:1:10}, a learning parameter r is equal to 0.99, an initial residual $e_0$ is equal to T, and a Sigmoid (S-curve) function $g(x)=1/(1+\exp(-x))$ is selected as an activation function.

During the construction of the federated stochastic configuration network, when the kth client adds the Lth node:
randomly generating 20 pairs of hidden layer parameters within an adjustable range [−1, 1], that is, inputting a weight $w_L^k$ and biasing $b_L^k$, and substituting same into the activation function $g(x)$;
outputting nodes in hidden layers $h_L^k=[g((w_L^k)^T x_1^k+b_L^k), g((w_L^k)^T x_2^k+b_L^k), \ldots, g((w_L^k)^T x_N^k+b_L^k)]^T$, where the T represents of a matrix or vector;
setting $\mu_L=(1-r)/(L+1)$, where L is the total number of hidden layer nodes of a current local network;
finding out the hidden layer nodes that satisfy the following inequality constraints as candidate nodes:

$$\min\{\xi_{L,1}^k, \xi_{L,2}^k, \ldots, \xi_{L,q}^k, \ldots, \xi_{L,m}^k\} \geq 0$$

where $$\xi_{L,q}^k = \frac{\langle e_{L-1,q}^T, h_L^k \rangle^2}{(h_L^k)^T \cdot h_L^k} - (1-r-\mu_L)\|e_{L-1,q}^T\|, q=1, 2, \ldots m;$$

and
if the hidden layer parameters that satisfy the conditions are not found in 20 rounds, liberalizing the conditions of a supervision mechanism: updating $r=r+\tau$, where the parameter $\tau \in (0, 1-r)$, until the parameters that satisfy the supervision mechanism are found.

The candidate nodes are substituted into $\xi_L^k = \sum_{q=1}^m \xi_{L,q}^k$, respectively to obtain $(\xi_L^1)^k, (\xi_L^2)^k, \ldots (\xi_L^j)^k$, $j \leq 20$, where $\xi_{L,q}^k$ represents a node supervision value of the nth random configuration in the $L^{th}$ iteration in the client k; $(\xi_L^1)^k, (\xi_L^2)^k, \ldots (\xi_L^j)^k$ are a plurality of newly added candidate nodes that satisfy the supervision mechanism for constructing a single-node pool of candidate hidden layers;

A group of hidden layer parameters corresponding to the maximum value $\xi_L^k$ is found out from the node pool, which are the best hidden layer parameters $(w_L^k)$ and $(b_L^k)*$ that satisfy the supervision mechanism.

The best candidate nodes are uploaded to a central server, where different parameters are loaded based on different algorithms, and the different algorithms include weighted aggregation and greedy selection:
uploading $(w_L^k)*$ and $(b_L^k)*$ by means of the weighted aggregation; and
uploading $(w_L^k)*$, $(b_L^k)*$ and corresponding $\xi_L^k$ by means of the greedy selection.
Step 2 includes:
The weighted aggregation or greedy selection is performed by the central server on the uploaded best nodes:
performing, by the central server, the weighted aggregation on the uploaded best nodes includes:
Performing, by the central server, the weighted aggregation on the uploaded parameters to obtain global parameters $w_L^*$ and $b_L^*$ of the Lth node;
where $$w_L^* = \sum_{k=1}^K \frac{n_k}{n}(w_L^k)^*, b_L^* = \sum_{k=1}^K \frac{n_k}{n}(b_L^k)^*;$$

and
in the formula, n is the total number of data samples of all the clients, and $n_k$ is the total number of data samples of the client k.
Performing, by the central server, the greedy selection on the uploaded best nodes includes:
comparing, by the central server, the uploaded parameters $\xi_L^k$, and selecting the client parameters corresponding to the maximum $\xi_L^k$ as the global parameters $w_L^*$ and $b_L^*$ of the Lth node;
where $$[W_L^*, b_L^*] = \underset{(w_L^k)^*, (b_L^k)^* \in \Theta}{\arg\max} \{\xi_L^k \in \Xi\}, k=1, 2, \ldots, K;$$

in the formula, $\Theta$ is a set of optimal parameters $(w_L^k)^*$ and $(b_L^k)^*$ uploaded by each client, and $\Xi$ is a set of $\xi_L^k$.
Step 3 includes:
After obtaining the global parameters $w_L^*$ and $b_L^*$, newly added hidden layer outputs and the output weights $\beta_L^k$ are calculated by each client and $\beta_L^k$ is uploaded to the server for the weighted aggregation, including:
according to the current global parameters $w_L^*$ and $b_L^*$, calculating, by each client, the newly added hidden layer outputs:

$$H_L^k = [g((w_L^*)^T x_1^k + b_L^*), g((w_L^*)^T x_2^k + b_L^*), \ldots, g((w_L^*)^T x_N^k + b_L^*)]^T$$

calculating a local hidden layer output matrix of the client:

$$\beta_L^k = [\beta_1^k, \beta_2^k, \ldots, \beta_L^k]^T := (H_L^k)^+ T_k$$

where $H_L^k = [H_1^k, H_2^k, \ldots, H_L^k]$; and
uploading, by each client, the output matrix $\beta_L^k$ to the central server, and performing the weighted aggregation by the server, on the uploaded $\beta_L^k$ to obtain $\beta_L$;
where $\beta_L = \sum_{k=1}^K n_k/n \beta_L^k$.
At this time, the residual of the stochastic configuration network for each client is: $e_L^k = H_L^k \beta_L - T^k$.
Step 4. When the number of the hidden layer nodes of the federated stochastic configuration network exceeds 100 or a residual in a current iteration meets an expected tolerance of 0.05, no new nodes are added, and the modeling is completed. Otherwise, the flow returns to step 1 to continue to construct the network until preset requirements are met. Each client downloads a soft sensor model of grinding particle sizes based on the federated stochastic configuration network. Each client collects local data online and input same into the global soft sensor model.

Step 5. Each client collects the ball mill current $c_1$, the spiral classifier current $c_2$, the mill feeding capacity $c_3$, the mill inlet feed water flow $c_4$ and the classifier overflow concentration $c_5$ in an online way, inputs same into the constructed soft sensor model of grinding particle sizes, and performs online estimation on the grinding particle sizes, i.e., $\tilde{x}^k = H^k \beta^k$, where $\tilde{x}^k$ is the product quality data estimated online by the client k.

The present disclosure provides the industrial process soft sensor method based on a federated stochastic configuration network. There are many methods and ways to implement the technical solution. The above description is only an exemplary implementation of the present disclosure. It should be pointed out that for a person of ordinary skill in the art, several improvements and modifications can be made without departing from the principles of the present disclosure, and these improvements and modifications should also be regarded as falling within the protection scope of the present disclosure. All the components not specified in this embodiment can be implemented by using existing technologies.

The invention claimed is:

1. An industrial process soft sensor method based on a federated stochastic configuration network, comprising the following steps:

step 1. acquiring, by each factory, historical industrial process auxiliary data and corresponding product quality data, and initializing parameters required for local stochastic configuration network model learning, each factory being a client, and each client putting hidden layer nodes that meet local data constraints into a candidate pool, selecting best candidate nodes from the candidate pool, and uploading same to a central server;

step 2. performing, by the central server, weighted aggregation or greedy selection on the uploaded best candidate nodes to obtain global parameters, and downloading the global parameters to each client as hidden layer parameters for a local stochastic configuration network model;

step 3. after obtaining the global parameters, calculating, by each client, newly added hidden layer outputs, and uploading output weights to the central server for weighted aggregation, and continuing to start a next round of training;

step 4. when the number of hidden layer nodes in a current network exceeds a maximum given value or a residual in current iteration meets an expected tolerance, adding no new nodes, and stopping federated training to obtain a trained global model; and step 5. distributing the trained global model, by the server, to each local factory as a soft sensor model;

wherein in step 1, a total of K factories are set to participate in the federated training, and for the kth factory, nk groups of historical industrial process auxiliary data Xk and corresponding product quality data Tk are obtained, denoted as {Xk,Tk}; the historical industrial process auxiliary datain the ith group of the kth factory contains z auxiliary process variables, the corresponding product quality data ti contains m product quality data, and if the value of i is 1 to nk, then an input sample matrix is; and the set of z auxiliary process variables in the ith group is denoted as, where represents the zth auxiliary process variable in the ith group of the kth factory.

2. The method according to claim 1, wherein in step 1, the initialized parameters required for local stochastic configuration network learning comprise: a maximum number of hidden layer nodes $L_{max}$, a maximum number of random configuration times $T_{max}$, an expected tolerance $\varepsilon$, a hidden layer parameter random configuration range $Y=\{\lambda_{min}:\Delta\lambda:\lambda_{max}\}$, a learning parameter r, an activation function $g(\cdot)$, and an initial residual $e_0=T^k$, where $\lambda_{min}$ is a lower limit of allocation interval of random parameters, $\lambda_{max}$ is an upper limit of allocation interval of the random parameters, and $\Delta\lambda$ is an incremental parameter of allocation interval of the random parameters.

3. The method according to claim 2, wherein step 1 further comprises: in a construction process of a local stochastic configuration network of each client, randomly generating the hidden layer parameters $w_L^k$ and $b_L^k$ in an adjustable symmetric interval Y, respectively;

outputting nodes in hidden layers $h_L^k=[g((w_L^k)^T x_1^k+b_L^k), g((w_L^k)^T x_2^k+b_L^k), \ldots, g((w_L^k)^T x_N^k+b_L^k)]^T$, where the superscript T is transpose of a matrix or vector;

setting $\mu_L=(1-r)/(L+1)$, where L is the total number of hidden layer nodes of a current local stochastic configuration network model, r represents the learning parameter, $\mu_L$ is a non-negative real number sequence;

finding out the hidden layer nodes that satisfy the following inequality constraints as candidate nodes:

$$\min\{\xi_{L,1}^k, \xi_{L,2}^k, \ldots, \xi_{L,q}^k, \ldots, \xi_{L,m}^k\} \geq 0$$

where $$\xi_{L,q}^k = \frac{\langle e_{L-1,q}^T, h_L^k \rangle^2}{(h_L^k)^T \cdot h_L^k} - (1-r-\mu_L)\|e_{L-1,q}^T\|^2, q=1, 2, \ldots, m;$$

in the formula, m represents the dimension of an output of each training set, the symbol $\langle \cdot, \cdot \rangle$ represents an inner product of the vector, $\xi_{L,q}^k$ represents a supervision mechanism corresponding to the qth output of each training set when the current number of the hidden layer nodes in the client k is L, $\xi_L^k=\Sigma_{q=1}^m \xi_{L,q}^k$ is calculated to obtain newly added candidate nodes $(\xi_L^1)^k, (\xi_L^2)^k, \ldots (\xi_L^j)^k$, $j \leq T_{max}$ for constructing the candidate pool, where $\xi_L^k$ represents a node supervision value randomly configured by the kth client during the Lth iteration, and $(\xi_L^j)^k$ represents another node supervision value obtained by the jth random configuration performed in the kth client during the Lth iteration; and finding out a group of hidden layer parameters that maximize $\xi_L^k$, which are the best hidden layer parameters $(w_L^k)^*$ and $(b_L^k)^*$ that satisfy the supervision mechanism.

4. The method according to claim 3, wherein step 1 further comprises:

selecting the best candidate nodes from the candidate pool and uploading same to the central server, comprising weighted aggregation and greedy selection:

uploading $(w_L^k)^*$ and $(b_L^k)^*$ by means of the weighted aggregation; and uploading $(w_L^k)^*$, $(b_L^k)^*$ and corresponding $\xi_L^k$ by means of the greedy selection.

5. The method according to claim 4, wherein step 2 comprises:

performing, by the central server, the weighted aggregation on the uploaded best candidate nodes to obtain global parameters $w_L^*$ and $b_L^*$ of the Lth node of the model;

wherein $$w_L^* = \sum_{k=1}^{K} \frac{n_k}{n}(w_L^k)^*, \quad b_L^* = \sum_{k=1}^{K} \frac{n_k}{n}(b_L^k)^*;$$

and in the formula, n is the sum of local historical industrial process auxiliary data $n_k$ of the clients.

6. The method according to claim 5, wherein step 3 comprises:

according to the current global parameters $w_L$ and $b_L^*$, calculating, by each client, the newly added hidden layer outputs $H_L^k$:

$$H_L^k=[g((w_L^*)^T x_1^k+b_L^*), g((w_L^*)^T x_2^k+b_L^*), \ldots, g((w_L^*)^T x_N^k+b_L^*)]^T$$

calculating a local hidden layer output matrix $\beta_L^k$ of the client:

$$\beta_L^k = (H_L^k)^+ T^k$$

wherein the current hidden layer output matrix is $H_L^k = [H_1^k, H_2^k, \ldots, H_L^k]$; and in the formula, $\beta_L^k$ represents that each client of the local clients k uploads the output matrix $\beta_L^k$ to the central server, and the central server performs the weighted aggregation on the uploaded $\beta_L^k$ to obtain a global output matrix $\beta_L^k$, where $$\beta_L = \sum_{k=1}^{K} \frac{n_k}{n} \beta_L^k.$$

7. The method according to claim 4, wherein step 2 comprises: performing, by the central serve, the greedy selection on the uploaded best candidate nodes comprising:
comparing, by the central server, the uploaded parameters $\xi_L^k$, and selecting client parameters corresponding to the maximum $\xi_L^k$ as the global parameters $w_L^*$ and $b_L^*$ of the Lth node of the model;
wherein $$[W_L^*, b_L^*] = \underset{(w_L^k)^*, (b_L^k)^* \in \Theta}{\arg\max} \{\xi_L^k \in \cdot\}, k = 1, 2, \ldots, K;$$

and in the formula, $\Theta$ is a set of optimal parameters $(w_L^k)^*$ and $(b_L^k)^*$ uploaded by each client, and $\Xi$ is a set of $\xi_L^k$.

8. The method according to claim 7, wherein step 3 comprises:
according to the current global parameters $w_L^*$ and $b_L^*$, calculating, by each client,
the newly added hidden layer outputs $H_L^k$:

$$H_L^k = [g((w_L^*)^T x_1^k + b_L^*), g((w_L^*)^T x_2^k + b_L^*), \ldots, g((w_L^*)^T x_N^k + b_L^*)]^T$$

calculating a local hidden layer output matrix $\beta_L^k$ of the client:

$$\beta_L^k = (H_L^k)^+ T^k$$

wherein the current hidden layer output matrix is $H_L^k = [H_1^k, H_2^k, \ldots, H_L^k]$; and in the formula, $\beta_L^k$ represents that each client of the local clients k uploads the output matrix $\beta_L^k$ to the central server, and the central server performs the weighted aggregation on the uploaded $\beta_L^k$ to obtain a global output matrix $\beta_L^k$, where $$\beta_L = \sum_{k=1}^{K} \frac{n_k}{n} \beta_L^k.$$

* * * * *